(No Model.)
J. A. HOUSER.
Seed Planter.
No. 240,827.  Patented May 3, 1881.
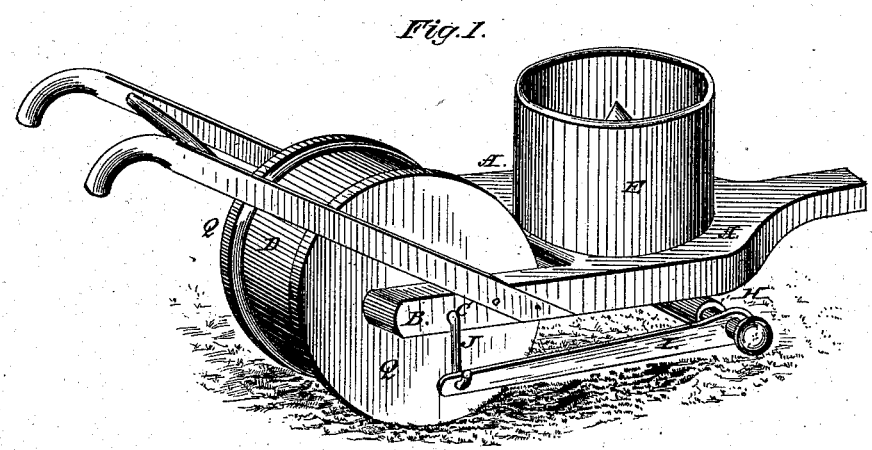
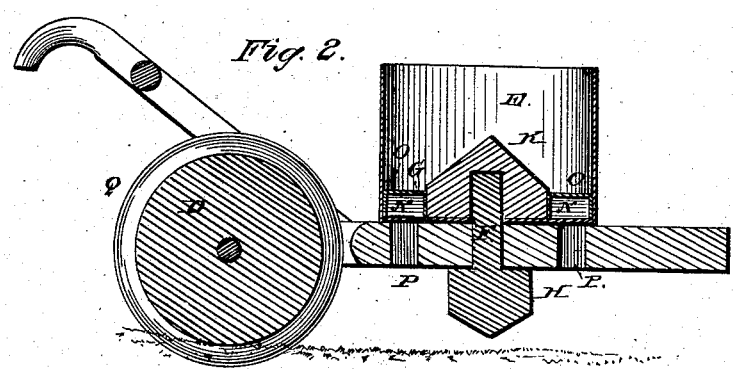
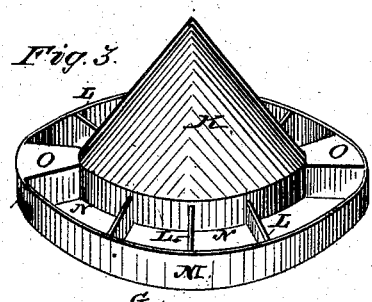

UNITED STATES PATENT OFFICE.

JOHN A. HOUSER, OF FORT VALLEY, GEORGIA.

SEED-PLANTER.

SPECIFICATION forming part of Letters Patent No. 240,827, dated May 3, 1881.

Application filed December 30, 1880. (No model.)

*To all whom it may concern:*

Be it known that I, JOHN A. HOUSER, of Fort Valley, in the county of Houston and State of Georgia, have invented certain new and useful Improvements in Seed-Planters; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a longitudinal vertical sectional view; and Fig. 3 is view of the bucket-wheel detached.

Corresponding parts in the several figures are denoted by like letters of reference.

This invention relates to machines for sowing cotton-seed, guano, corn, and other seed; and it consists in certain improvements in the construction of the same which will be hereinafter fully described, and particularly pointed out in the claim.

In the drawings hereto annexed, A represents the frame or bed of the machine, which is provided with rearward-extending beams, B B, having bearings for the shaft or axle C, carrying a wheel or roller, D.

E is a box or hopper mounted upon bed A, in which is formed an opening or bearing for a vertical shaft, F, upon which the bucket-wheel G is firmly secured. The shaft F is provided at its lower end with a crank or transverse arm, H, connected, by a pivoted rod, I, with a crank, J, formed upon one end of the axle C, which thus, when it revolves, transmits an oscillating motion to the shaft F and to the bucket-wheel mounted upon the latter.

The bucket-wheel G consists of a central conical disk, K, having radial arms or partitions L, connected by an annular rim, M, thereby forming a circumferential series of buckets, N. Two of these, on diametrically opposite sides, are covered, as shown, by plates D D, and under these the bottom of the hopper and the bed of the machine are perforated at P P, to enable the seed to drop into the furrow formed by a suitably-constructed opener attached to the front end of the frame, (but not shown in the drawings,) no novelty being claimed in its construction. The sides of the wheel or roller D are provided with beveled flanges Q Q, so that it shall tend not only to cover the seed, but also to compress the soil around it.

The operation of my invention will be readily understood from the foregoing description, taken in connection with the drawings hereto annexed. As the machine passes over the ground the roller D rotates and conveys, through the mechanism described, an oscillating motion to the bucket-wheel G. The conical shape of the body of the latter, together with the motion, tends to feed the contents of the hopper to the buckets, of which those adjoining the covered buckets O are alternately brought over the openings or spouts, thus permitting the seed to drop. The roller D serves to cover the seed and compress the soil. Separate coverers may, however, be used if desired, or if it should prove necessary to the successful operation of the machine.

The extreme simplicity of my improved seeding-machine renders it durable and inexpensive, as well as not liable to get out of order.

I am aware that a revolving wheel having arms or partitions connected by an annular rim to form buckets for carrying and delivering seed to the discharge-opening in the hopper is common in corn-planters, and such I do not wish to be understood as claiming, broadly, as of my invention.

Having thus described my invention, I claim and desire to secure by Letters Patent of the United States—

The herein-described seed-planter, composed of the frame A, having covering-roller D, provided with crank J, connecting-rod I, crank or transverse arm H, oscillating vertical shaft projecting up through hopper and carrying bucket-wheel G, composed of a central conical disk, K, having radial arms or partitions L, connected by annular rim M, forming a circumferential series of buckets, two of which are covered by plates O O, and the hopper and frame provided with discharge-openings P P, the several parts constructed and relatively arranged to operate in the manner specified.

In testimony that I claim the foregoing as my own I have hereto affixed my signature in presence of two witnesses.

JOHN A. HOUSER.

Witnesses:
 JNO. MAY JENNINGS,
 JEFF. D. HOUSER.